July 23, 1929. M. H. BRANDON 1,722,193
NEWSPAPER TRUCK
Filed July 24, 1928
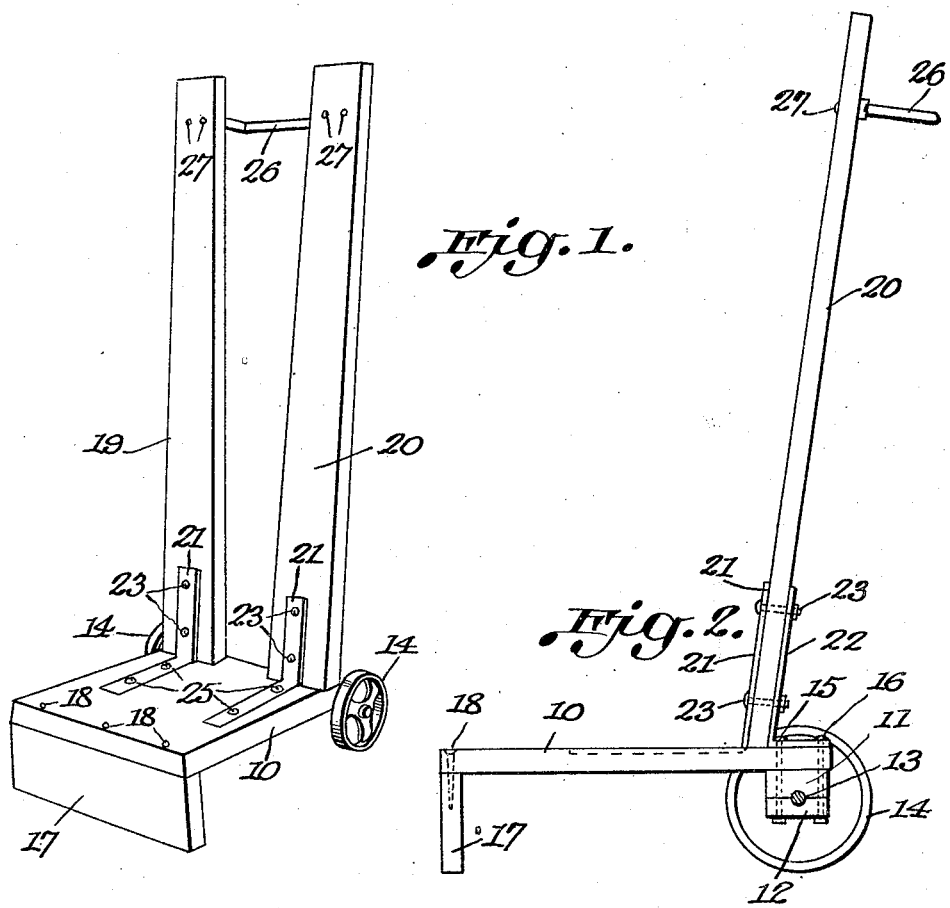
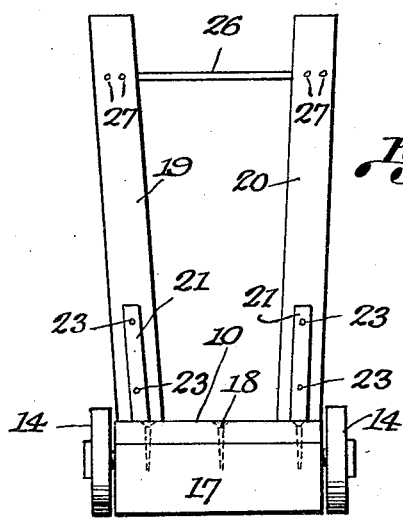

Patented July 23, 1929.

1,722,193

UNITED STATES PATENT OFFICE.

MAURICE H. BRANDON, OF CHARLOTTE, NORTH CAROLINA.

NEWSPAPER TRUCK.

Application filed July 24, 1928. Serial No. 295,040.

My invention relates to a newspaper truck and more especially to a truck adapted for hauling a great number of newspapers and other objects for short distances.

An object of my invention is to provide a newspaper truck having wheels thereon with a flat platform portion, a back portion, and a front portion to elevate the platform portion above the floor on which the wheels rest in order to insure that the newspapers or other articles packed on the platform will not become soiled by engaging with the floor.

Some of the objects of my invention having been stated, other objects will appear as the description proceeds when taken in connection with the accompanying drawings, in which:—

Figure 1 is a perspective view of my truck;

Figure 2 is a side elevation with the nearest wheel removed;

Figure 3 is a front elevation of my truck.

Referring more particularly to the drawings, the numeral 10 indicates the platform of my truck and secured to the lower rearward surface of this platform are the bearing members 11 and 12 in which the axle 13 is mounted and on the ends of this axle the wheels 14 are mounted, the said bearing being secured to the said platform by means of the bolts 15 and 16. To the lower forward portion of the platform 10 is secured the vertically disposed portion 17 by means of the screws 18 or any other suitable means, and projecting upwardly and rearwardly from the rear portion of the platform are the members 19 and 20, which are secured to the platform by means of the members 21 and 22 which have the bolts 23 piercing said members and the members 19 and 20 to hold the portions 19 and 20 securely to the platform, the lower portion of the members 22 being secured to the platform by the same bolts 15 and 16 which secure the bearings to the platform and the front members 21 being embedded in the platform and having the upper surface flush with the surface of the platform and secured thereto by means of the bolts 25. From the upper ends of the members 19 and 20 and on the rear sides thereof projects the handle 26 which is secured to these members 19 and 20 by any suitable means, such as the bolts 27, this member 26 projecting backwardly far enough to serve as a support for the members 19 and 20 to hold the same at some distance from the floor when the truck is tilted backwardly, so as to prevent newspapers and other articles carried by the truck from becoming soiled by engaging with the floor.

In the drawings and specification I have set forth a preferred embodiment of my invention, and although specific terms are employed they are used in a generic and descriptive sense only and not for purposes of limitation, the scope of the invention being set forth in the appended claim.

I claim

In a newspaper truck, a horizontally disposed platform, a support for the front portion of the platform, a wheeled support secured to the rear portion of the platform, upwardly projecting members secured to the rear portion of the platform by means of iron straps secured to the upwardly projecting members on the front portion thereof and having their lower horizontal portions embedded flush with the upper surface of the platform, iron straps secured to the rear portions of the upstanding projections and having their horizontal portion secured to the upper surface of the platform, and an extended combined handle and support secured to the rear surfaces of the said upstanding projections.

In testimony whereof I affix my signature.

MAURICE H. BRANDON.